(12) United States Patent
Basilicato et al.

(10) Patent No.: US 7,537,184 B1
(45) Date of Patent: May 26, 2009

(54) BOOM DEVICE FOR PRESENTATION APPLIANCES

(75) Inventors: Alfred N. Basilicato, Moorestown, NJ (US); Louis M. Notarianni, Hatboro, PA (US)

(73) Assignee: Numonica Corporation, Montgomeryville, PA (US)

( * ) Notice: Subject to any disclaimer, the term of this patent is extended or adjusted under 35 U.S.C. 154(b) by 48 days.

(21) Appl. No.: 10/805,698

(22) Filed: Mar. 22, 2004

Related U.S. Application Data

(60) Provisional application No. 60/456,742, filed on Mar. 21, 2003.

(51) Int. Cl.
*A47F 5/00* (2006.01)

(52) U.S. Cl. .............................. 248/123.11; 248/123.2

(58) Field of Classification Search .............. 248/123.2, 248/162.1, 163.1, 163.2, 123.11, 141.1, 124.1, 248/917, 441.1, 176.1, 127, 125.2, 918, 919, 248/923, 406.2; 353/79, 80; 211/191, 206
See application file for complete search history.

(56) References Cited

U.S. PATENT DOCUMENTS

| | | | | |
|---|---|---|---|---|
| 1,855,964 A | * | 4/1932 | Higginbotham | .......... 248/123.2 |
| 5,253,832 A | * | 10/1993 | Bolas et al. | ............ 248/123.11 |
| 5,941,713 A | * | 8/1999 | Wayner et al. | .............. 434/414 |
| 6,540,366 B2 | * | 4/2003 | Keenan et al. | ................ 353/79 |
| 6,736,516 B1 | * | 5/2004 | Kepley, Jr. et al. | ............ 353/79 |

* cited by examiner

*Primary Examiner*—A. Joseph Wujciak, III
(74) *Attorney, Agent, or Firm*—Blank Rome LLP

(57) ABSTRACT

The present invention is a boom device or support stand designed to provide an all-in-one mobile presentation station, accommodating an interactive board or viewing screen, a computer, and a projector. In one embodiment, the stand includes a base, two sets of upright support members, one set to support the board and the second set to support the projector through attachment to an intermediary boom arm. A weight can also be attached to the boom arm to counterbalance the projector about the second set of uprights or to minimize energy transferred to the projector through movement or vibration of the boom device, usually via operator interaction with the board. A dampening device can be positioned between the first and second uprights to further absorb this energy. The boom device can also include a shelf to house a computer and other presentation devices.

7 Claims, 4 Drawing Sheets

BOOM DEVICE FOR PRESENTATION APPLIANCES

RELATED INVENTION

This application claims benefit of U.S. Provisional Application Ser. No. 60/456,742, filed Mar. 21, 2003, entitled "BOOM DEVICE FOR PRESENTATION APPLIANCES," which is incorporated herein, in its entirety, by this reference.

FIELD OF THE INVENTION

The present invention relates to a stand to support a screen or interactive whiteboard, a computer, and a projector, the stand being designed to provide an all-in-one presentation station.

BACKGROUND OF THE INVENTION

Presentation appliances, comprising an interactive board, a computer, and a projector are often taken on the road for presentation purposes. Temporary set-up at tradeshows or visiting conference rooms is difficult and cumbersome, and can result in a less than ideal presentation. What is needed is a mobile and convenient stand that provides support for the interactive board, computer, projector, and related wiring, while allowing for proper relative arrangement of the projector to the board to provide good visual presentation.

SUMMARY OF THE INVENTION

The present invention is a support stand designed to provide an all-in-one mobile presentation station, accommodating an interactive board, a computer, a projector and all required wiring of a presentation appliance. In one aspect of the present invention, the stand for a presentation appliance includes a plurality of vertical poles that support a presentation board and projector of the presentation appliance. A boom arm retains the projector of the presentation appliance, where a middle or a proximal end of the boom arm is in communication with the vertical poles and a distal end of the boom arm is adapted to support the projector. The stand also includes a base associated with the vertical poles, or a base associated with each vertical pole. The base or bases are adapted to balance and counteract a moment of the projector about the vertical poles. A weight supported by the boom arm on a side of the vertical poles opposite the projector can also be included, the weight being adapted, in conjunction with the base, to counteract a moment of the projector.

In another aspect of the invention, a support stand for a projector and screen is provided that includes a first set of upright members in communication with a screen, a second set of upright members in communication with a projector, and a base connecting the first and the second set of upright members. A boom arm, movably attached to the second set of upright members, can be included to support the projector. The boom arm could also support a weight, where the weight is positioned to counterbalance the projector about the second set of upright members, or where the weight acts to minimize vibration of the projector. The weight can be attached to the boom arm by a flexible, elastic, or spring-loaded mechanism to absorb energy translated through the upright members.

In another aspect, a dampening device is positioned between the first and the second set of upright members to absorb energy transferred to the board, thereby minimizing vibration of the projector. Further, a shelf could be positioned between and in communication with the first or the second set of upright members to accommodate a computer, printer or other presentation devices. Separate base members could connect each of a respective first and second upright member of a set, or a single base could attach all upright members.

BRIEF DESCRIPTION OF THE DRAWINGS

For the purpose of illustrating the embodiments of the present invention, there is shown in the drawings forms presently preferred; it being understood, however, that the present invention is not limited to the precise arrangements and instrumentalities shown.

DETAILED DESCRIPTION OF ILLUSTRATIVE EMBODIMENTS

Figure 1:
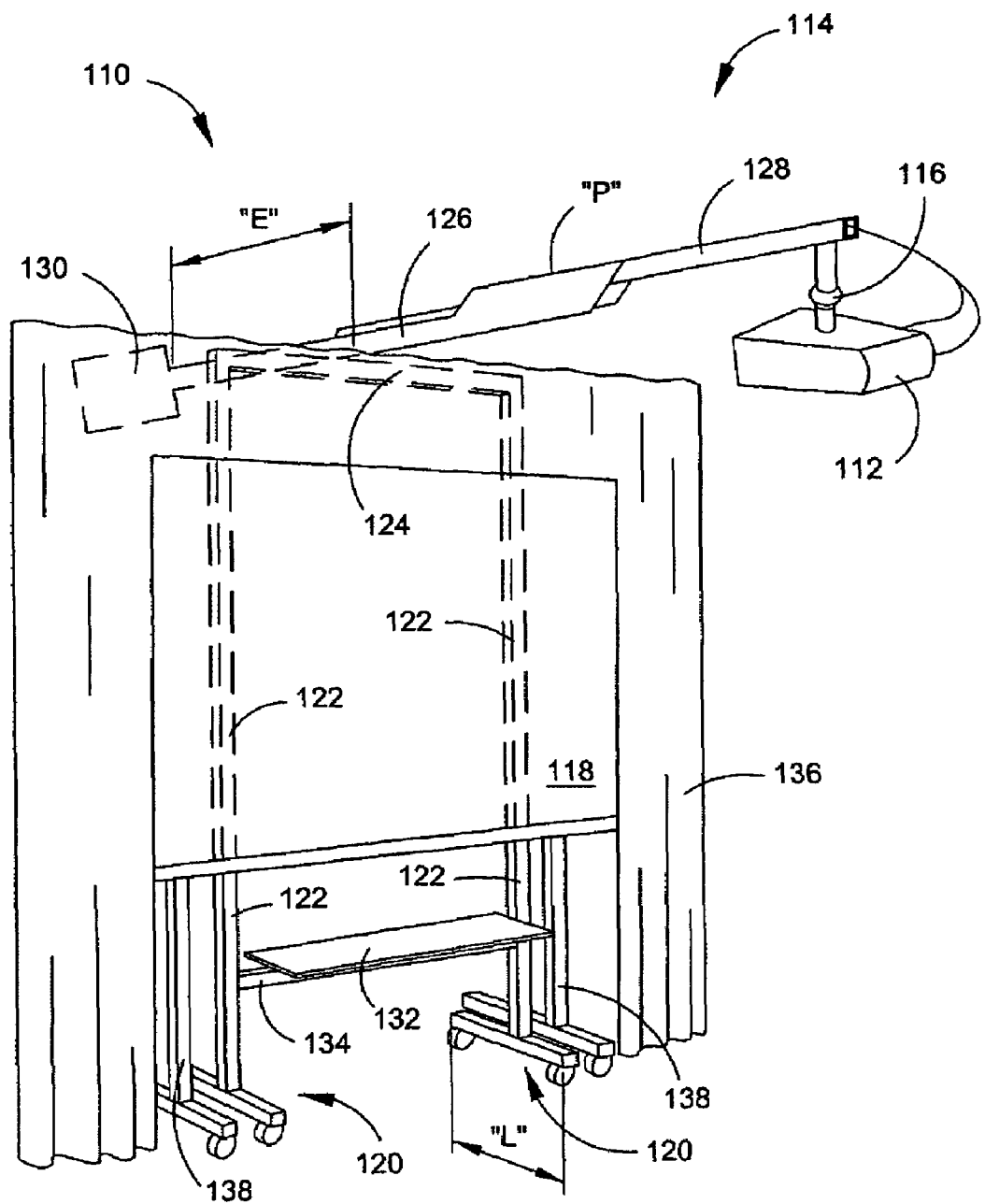
FIG. 1 illustrates a front perspective view of a boom device or support stand in accordance with one embodiment of the present invention, showing the boom device supporting a projector and board of a presentation appliance.

The boom stand or support stand 110 is designed as an all in one mobile presentation station, accommodating a screen or interactive board, a computer, a projector and all required wiring of a presentation appliance. In a first embodiment of the present invention, illustrated in FIG. 1, a projector 112 hangs from an end of a boom arm 114, and is mounted on a swivel bracket 116, which could be a universal swivel mount bracket. With the projector 112 hanging in this position, the floor space directly in front of an interactive whiteboard 118 is free for easy demonstration. In addition, the quality of the projected image is improved because the apparent projected hot spot visible on the board surface is moved to the top of the surface area, rather than the bottom, making it less noticeable. Further, due to the "projection from above configuration", the presenter is not constantly stepping into the projected image, as occurs when using a floor or table mounted projector.

The boom arm 114 is directly attached, in this embodiment, to the support structure accommodating the board (e.g., the mobile stand), as shown in FIG. 1. The support structure can include two support stands 120, two vertical poles 122, and a horizontal bar 124. The boom arm 114 is attached in the vicinity of the center of the horizontal bar 124. This attachment can be adjustable along the bar 124 in order to align a center of a lens of the projector 112 to a center of the board 118. The swivel bracket 116 could also be adapted for such adjustment. The boom stand 110 can be aluminum, fiberglass, titanium, a combination of aluminum and fiberglass, or can be of other materials having a high strength to weight ratio.

The support stands 120 (each stand 120 forming a "T" with a respective vertical pole 122 when inverted) can be made of heavy materials, such as solid steel, brass, or lead, to counteract the weight and moment arm of the projector 112 and the boom arm 114. Alternatively, the support stands 120 could be filled with material suitable to provide the counteractive weight. Further, the length of each stand "L" could be increased to provide counteracting balance.

The boom arm 114, in this embodiment, includes a proximal bar 126 and a distal bar 128, a distal end of the distal bar 128 communicating with the swivel bracket 116. Attachment point "P" of the proximal and the distal bars 126, 128 can be translatably adjustable to set a distance of the projector 112 from the board 118 for desired or proper throw distance based on a rating of the projector 112. Accordingly, the boom device 110 can accommodate any short or long throw projector.

To further provide a counterbalance for the projector 112 about the support structure, the proximal arm 126 could extend beyond (behind) the horizontal bar 124 (shown as arrow "E" in FIG. 1), with a suitable counterweight 130 fixed thereon. Any one or any combination of the counterbalance techniques discussed above could be employed in an embodiment of the present invention.

A shelf 132 could also be provided on the boom device 110 to accommodate a computer and/or printer. Electrical power could be provided via an outlet strip 134 mounted to the underside of the shelf 132 (one electrical cord could thereby provide all required power). Common hand tools are all that is required assemble/disassemble the boom device 110, making it very suitable for quick and easy assembly in the field, such as at tradeshows.

FIG. 1 also illustrates a tarp, surround sign, or background panel 136, as would be typically used at tradeshows. The legs 138 shown in FIG. 1 support the background panel 136. The background panel 136 could, however, be incorporated into and supported by the boom device 110 in other embodiments of the present invention.

Figure 2:
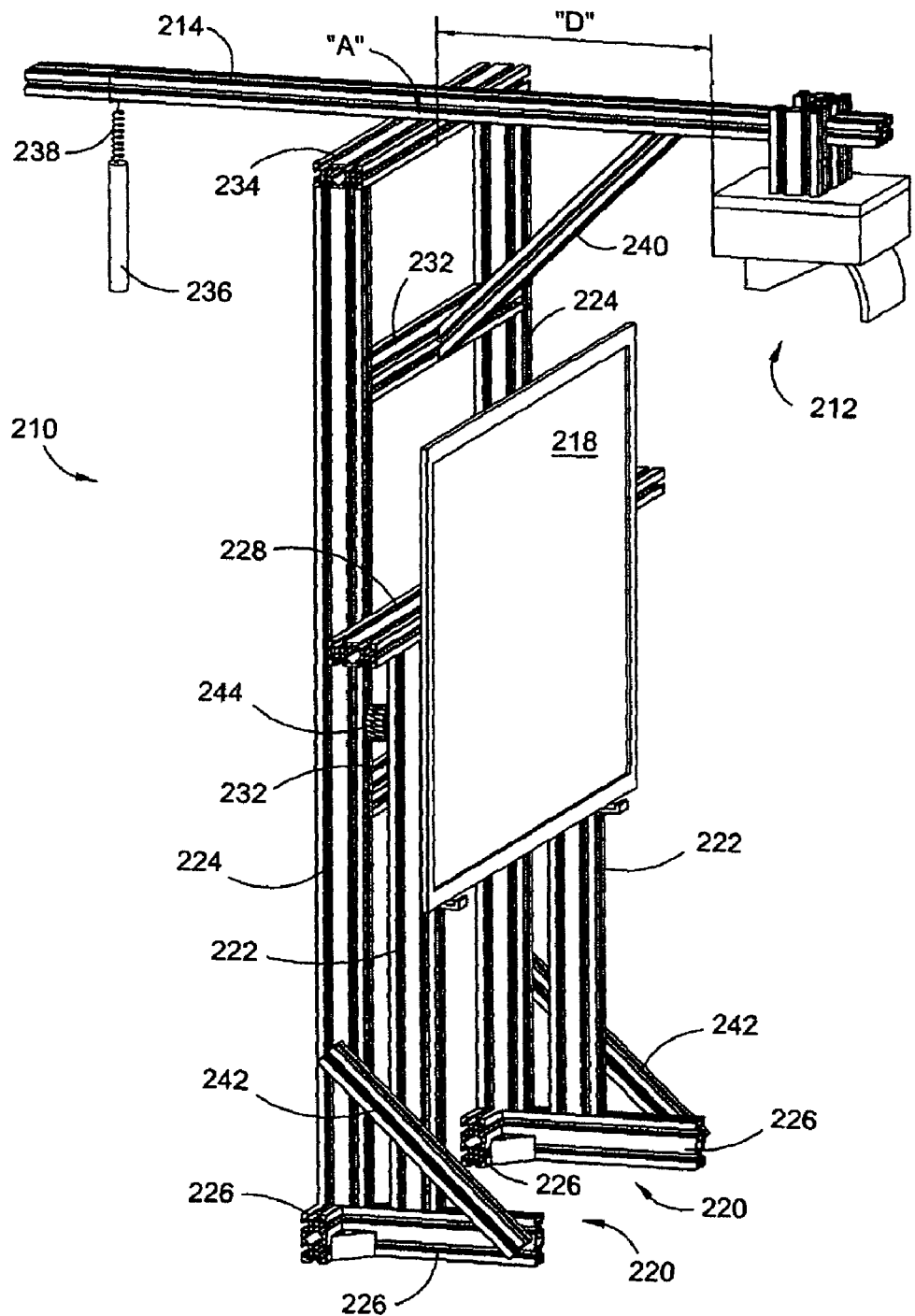
FIG. 2 illustrates a side perspective view of a boom device or support stand in accordance with another embodiment of the present invention, showing the boom device supporting a projector and board of a presentation appliance.
Figure 3:
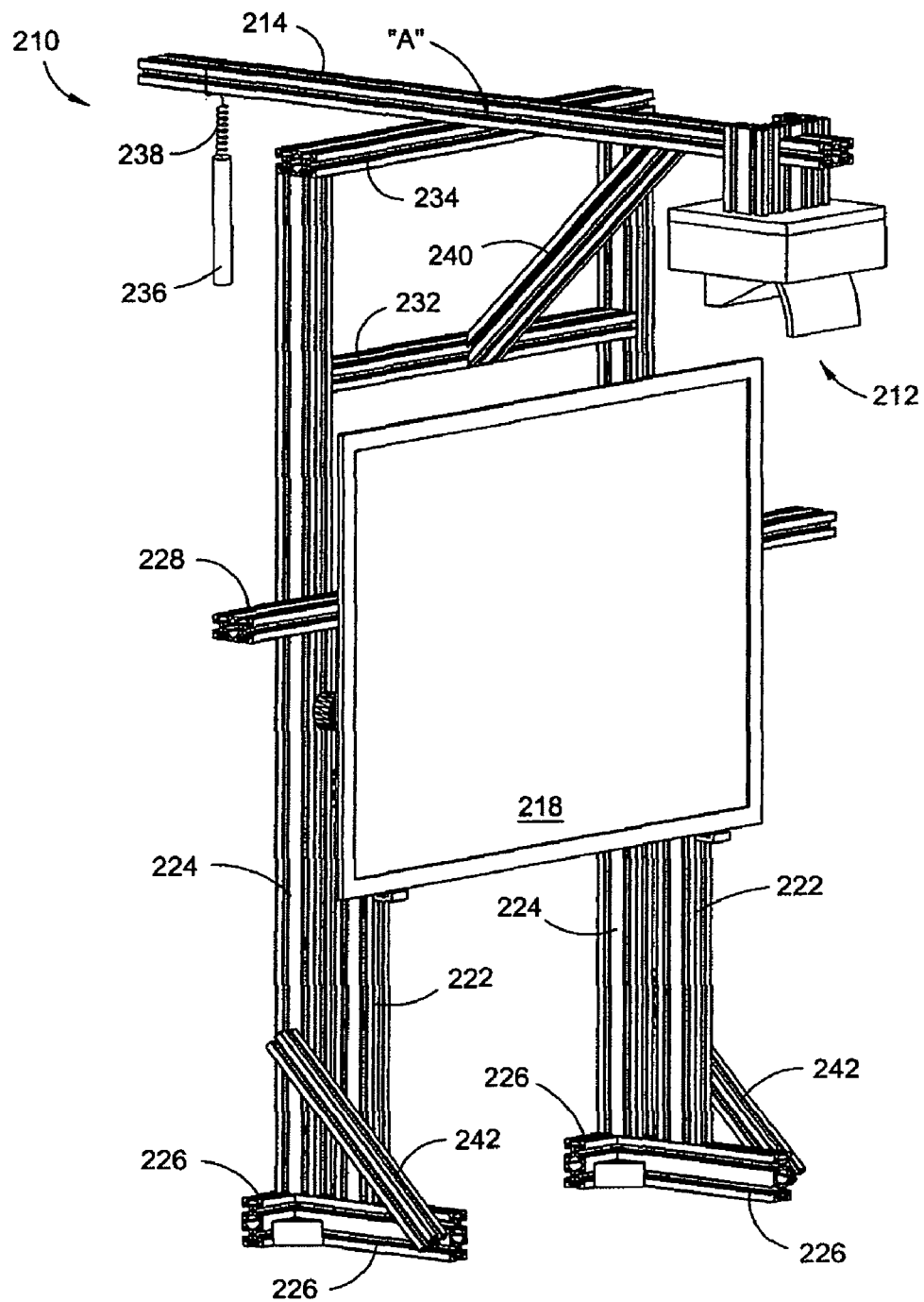
FIG. 3 illustrates a front perspective view of the boom device of FIG. 2.
Figure 4:
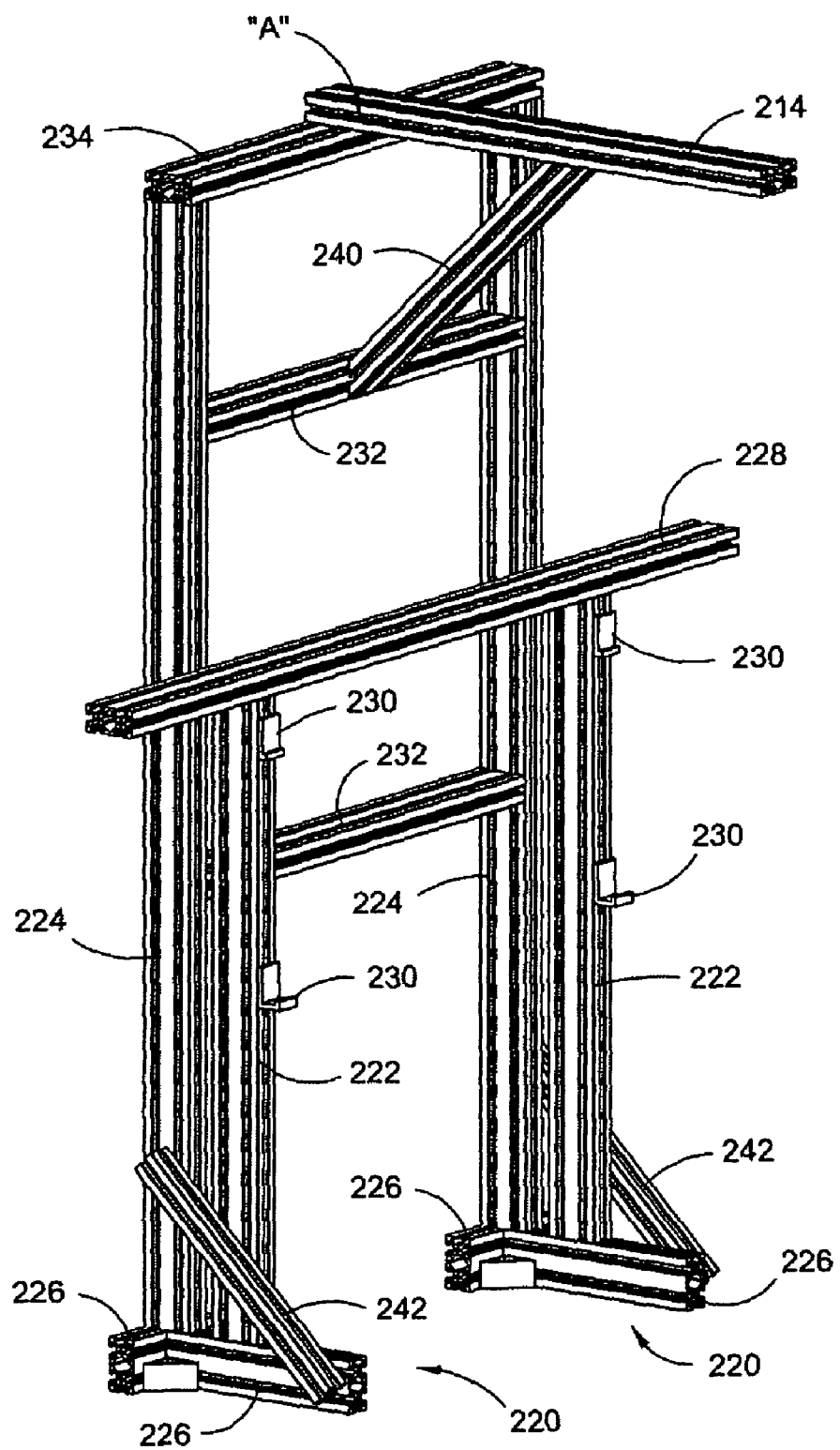
FIG. 4 illustrates a front perspective view of the boom device of FIG. 2 without the projector or board.

Another embodiment of the invention is illustrated in FIGS. 2 through 4. In this embodiment, the projector 212 hangs from a boom arm 214 supported by uprights separate from those responsible for support of the screen or board 218. This configuration provides a dampening effect, where a tapping of the board 218, as typically occurs with use of an interactive board, does not result in a transfer of energy (movement) through the support stand 210 to the projector 212, causing movement to or waving of the projected display on the screen 218.

In this embodiment, the boom device or support stand 210 includes two bases 220, two sets of upright support members 222, 224, and the boom arm 214 to support the projector 212. The base 220 can include any arrangement of members 226 providing stability and balance for the stand 210. In one aspect, the base members 226 are configured in a "T" (as viewed from above). The base 220 can also include wheels for mobility.

The first (or front) set of upright support members 222 are interconnected by a horizontal bar 228. The interconnecting bar 228 can be of a length just sufficient to reach and connect the first set of uprights 222, or the bar 228 can extend beyond the first set of uprights 222, on one or both sides (as shown in FIGS. 2 through 4), to accommodate the hanging of a background curtain, or promotional banner, or the like. The screen or board 218 is simply hung on the front set of uprights 222, and/or the horizontal bar 228, with hangers or clips 230 (as shown in FIG. 4).

The second (or back) set of upright support members 224 are interconnected by midway bracing bars 232 and a top bar 234. The boom arm 214 can be fixed or adjustably connected to the top bar 234. The boom arm 214 can begin at attachment point "A" of the top arm 234 and extend outwardly (or forwardly) in one direction only for projector 212 support (as shown in FIG. 4), or the boom arm can extend in two directions from attachment point "A" (as shown in FIGS. 2 and 3) to also support a counterbalance, or weight 236 behind the screen 218. The weight 236 can be fixedly attached to the boom arm 214, or can communicate with the boom arm 214 through a flexible, elastic or spring-loaded mechanism 238 (as shown in FIGS. 2 and 3). One or more projector support braces 240 can assist support of the projector 212 through connection between the boom arm 214 and a midway bar 232 or the second (back) set of uprights 224.

As illustrated in FIGS. 2 through 4, each set of upright support members 222, 224, includes two bars. It is to be understood that alternative embodiments of the present invention could include one, or three, or more bars in each set of upright support members 222, 224. Adaptation of the base 220 to accommodate these alternative embodiments would be required, such as by having a base member 226 interconnect the bases 220 to accommodate a single bar set of uprights 222, 224, or by simply adding a base 220 for a three bar set of upright support members 222, 224.

In the embodiment illustrated in FIGS. 2 through 4, the first and the second sets of uprights 222, 224 are not attached, or do not communicate, with one another other than through a mutual attachment to base members 226. Base brace members 242 are each connected to a respective base member 226 and second (back) upright support member 224. There is no communication between a base brace member 242 and a first (front) upright support member 222.

The independently configured first and second sets of uprights 222, 224 help contain, or minimize, any translation of movement from the board 218, as typically occurs with use of a board of an interactive presentation appliance, to the projector, which subsequently results in movement of the display on the board 218. To further alleviate the translation of movement, a shock absorbing or dampening device 244 can be positioned between the first and the second sets of uprights 222, 224. The dampening device 244 can be located anywhere, and exist in any number, between the first and the second sets of uprights 222, 224, but preferably one device 244 exists per pair of respective first and second uprights 222, 224, and is located toward the top of the first set of uprights 222 (as shown in FIG. 2). The dampening device 244 could simply be a wedge of foam or similar material, or could be a spring or air cylinder.

In addition to acting as a counterbalance for the projector 212, the weight 236, especially if provided with a flexible, elastic or spring-loaded mechanism 238, also acts to dampen any motion transferred from the board, through the first and the second set of uprights 222, 224, to the boom arm 214. Motion of the boom arm 214, relative to the weight 236, is absorbed by the flexible, elastic or spring-loaded mechanism 238 rather than transferred to the projector 212, setting it in motion.

The embodiment illustrated in FIGS. 2 through 4 includes use of a short throw projector 212. Accordingly, in this embodiment, a distance "D" is approximately 20 inches. Naturally, any projector could be mounted to the boom device 210. With longer throw projectors, the distance "D" might be closer to 5 feet, with the additional moment counterbalanced about the second set of uprights with a larger weight 236 and/or larger or heavier base members 226.

Either embodiment of the boom device 110, 210 could be constructed from an extruded aluminum structural framing system, having slots and slidable "T-nuts" providing ease of construction, breakdown, and transportation, as is necessary for repetitive temporary use, such as during tradeshows or traveling conference calls. Welded, adhered, or self-tapping screw applications could also be used. The second embodiment illustrated in FIGS. 2 through 4 can also include a shelf like that shown and described in the embodiment of FIG. 1.

These and other advantages of the present invention will be apparent to those skilled in the art from the foregoing specification. Accordingly, it is recognized by those skilled in the art that variations or modifications may be made to the above-described embodiments without departing from the broad inventive concepts of the invention. It is therefore understood that this invention is not limited to the particular embodiments described herein, but is intended to include all possible variations and modifications within the scope and spirit of the invention.

What is claimed:

1. A support stand apparatus for a projector and a screen, comprising:
   a first set of upright members having a screen support location adapted to support a screen; and
   a second set of upright members having a projector support location adapted to support a projector, wherein the first set of upright members are horizontally positioned between the second set of upright members and the projector support location; and
   a top bar attached perpendicular to a first member of the second set of upright members and a second member of the second set of upright members,
wherein the apparatus further comprises a boom arm mounted on and adjustably along the top bar for variable horizontal positioning relative to the second set of upright members, wherein the projector support location is located at one end of the boom arm extending forward, wherein the boom arm also supports a weight located at a second end of the boom arm positioned behind the first set of upright member and the second set of upright members communicating only with the boom arm, wherein the weight is positioned to counterbalance the projector about the second set of upright members.

2. The apparatus of claim 1, wherein the weight is attached to the boom arm by a flexible, elastic, or spring-loaded mechanism to absorb energy translated through the second set of upright members.

3. The apparatus of claim 1, further comprising a flexible, elastic, or spring-loaded dampening device positioned between the first and the second set of upright members.

4. The apparatus of claim 1, further comprising a shelf positioned between and in communication with the first or the second set of upright members to accommodate a computer, printer or presentation devices.

5. The apparatus of claim 1, wherein a separate base member directly connects to and supports each member of each of the first and the second sets of upright members.

6. The apparatus of claim 1, wherein a single base member directly connects to and supports each of adjacent members of the first and the second set of upright members.

7. The apparatus of claim 1, wherein the second set of upright members is longer than the first set of upright members.

* * * * *

UNITED STATES PATENT AND TRADEMARK OFFICE
CERTIFICATE OF CORRECTION

PATENT NO.       : 7,537,184 B1                                                     Page 1 of 1
APPLICATION NO.  : 10/805698
DATED            : May 26, 2009
INVENTOR(S)      : Alfred N. Basilicato and Louis M. Notarianni It is certified that error appears in the above-identified patent and that said Letters Patent is hereby corrected as shown below:

Title page, Item (73), Assignee,
Delete "Numonica" and insert -- Numonics --

Signed and Sealed this

Sixteenth Day of November, 2010

David J. Kappos
*Director of the United States Patent and Trademark Office*